Figure 1:
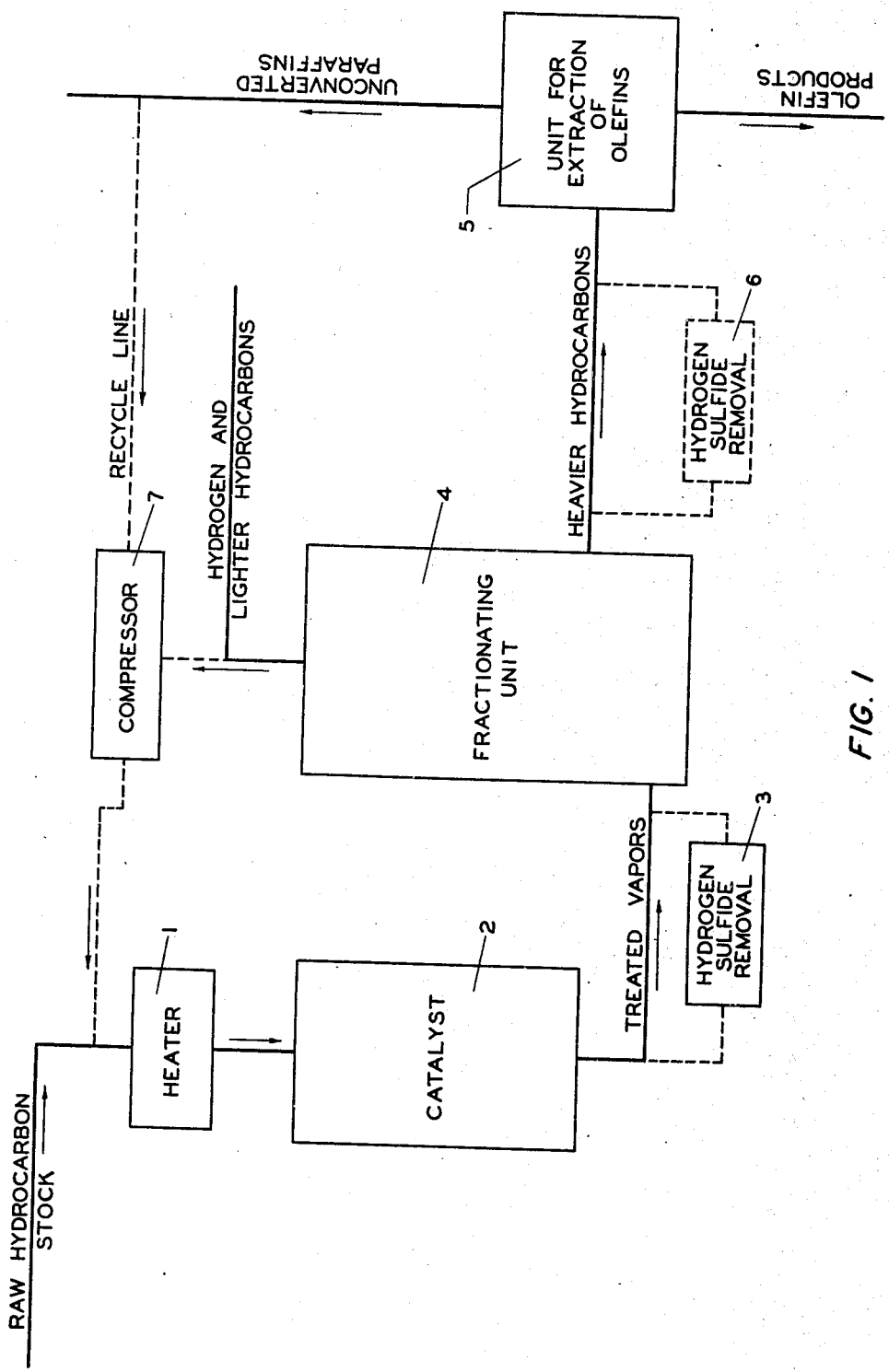

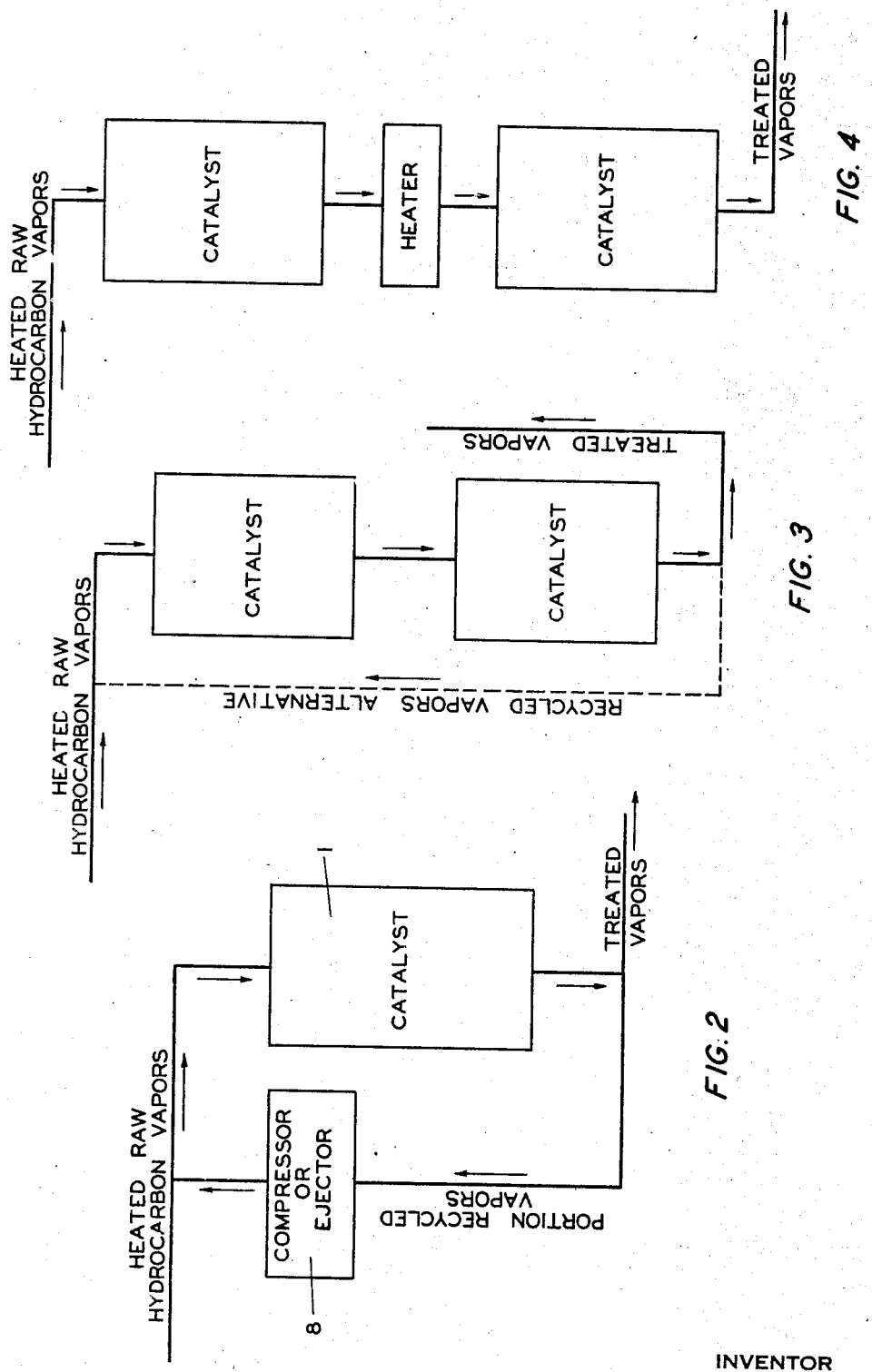

Patented July 28, 1942

2,291,581

UNITED STATES PATENT OFFICE 2,291,581

PROCESS FOR TREATMENT OF HYDROCARBONS

Walter A. Schulze, Bartlesville, Okla., assignor to Phillips Petroleum Company, a corporation of Delaware Application March 20, 1939, Serial No. 263,000

2 Claims. (Cl. 260—683)

This invention relates to the treatment of hydrocarbons and relates more particularly to improved catalytic methods of treating such hydrocarbons.

In a more specific sense one of the objects of this invention is a process of treating petroleum hydrocarbons such as the lower members of the paraffin series (excepting methane), which occur in crude petroleum oils, natural gasolines and natural gas, in the vapor form over certain catalytic materials to remove the organic sulfur compounds and to produce dehydrogenation and other desirable refining effects.

This application is a continuation-in-part of my copending application Serial No. 106,697, filed October 20, 1936.

In another copending application, Serial No. 104,306, filed October 6, 1936, I have shown the effects obtained by treating hydrocarbon vapors over catalytic materials of the bauxite type at temperatures of 900 to 1200° F. In addition to the decomposition of organic sulfur impurities, other reactions are made to take place, among which are dehydrogenation reactions. While the exact nature of the reactions which occur during the treatment of light hydrocarbons over a catalyst of the peculiar nature of bauxite have not been proven conclusively, it is reasonably certain that several concurrent reactions occur, namely (1) decomposition of deleterious organic sulfur compounds to hydrogen sulfide which may be removed, (2) decomposition and subsequent removal of impurities other than the sulfur type, (3) dehydrogenation of hydrocarbon constituents, and (4) changes in molecular structure of certain of the hydrocarbons, the extent of each reaction varying with the stock being treated and the convertive conditions.

I have discovered certain improvements in catalytic materials for effecting these changes which result in a remarkable degree of conversion with only a small decrease in volume of product boiling within the same range as the untreated stocks.

A further object of this invention is the production of larger quantities of hydrogen during the treatment of hydrocarbon vapors over these improved catalytic materials, the increased quantity of hydrogen being due to more extensive dehydrogenation of the hydrocarbons.

In its broader aspects, the invention lies in the peculiar combination of a highly catalytic adsorbent material such as bauxite with a metallic oxide which exerts a strong dehydrogenation activity on hydrocarbons, which combination is utilized as a contact catalyst for simultaneously decomposing the objectionable organic sulfur compounds and the like and dehydrogenating certain of the hydrocarbon constituents and changing the molecular structure of certain others.

In the specific embodiment of this invention, dehydrated bauxite is impregnated with a solution of a soluble chromium salt such as the nitrate. The chromium salt in rather concentrated solution is merely sprayed as a mist onto the dehydrated bauxite which completely adsorbs the solution and immediately appears dry. The subsequent conversion of said chromium salt to the oxide may be accomplished in several ways. For example, the nitrate may be reduced to the oxide form by passing hydrogen or other reducing gas over the impregnated bauxite at elevated temperature. Or, the nitrate may be converted by alkaline solution treatment to the hydroxide, and said hydroxide changed to oxide form by heating in a stream of a reducing gas.

Heretofore certain refining materials have been made by mixing certain metal salts with finely divided or colloidal clay by dissolving the salt in a liquid solvent and adding the solution to the clay to form a gel, but in such instances the liquid and clay were first stirred into a paste, or cream, and the solvent removed later. Obviously my process of manufacturing catalytic material is far different, and due to its simplicity has many economic advantages. Furthermore, I believe no mention has ever been made to this specific catalytic material comprising bauxite and a chromium salt or oxide.

I have discovered that bauxite impregnated with chromium oxide is an extremely effective catalytic material for dehydrogenation of hydrocarbons and simultaneous conversion of organic sulfur compounds to hydrogen sulfide. It is recognized that chromium oxide has dehydrogenating properties but such catalysts are generally very susceptible to poisoning, especially by sulfur compounds and the like. It is known, too, that bauxite has excellent desulfurizing activity and organic sulfur compounds such as mercaptans, alkyl sulfides and the like are decomposed to hydrogen sulfide. It is possible, therefore, to treat the sulfur bearing hydrocarbon vapors in an initial step with bauxite whereby the sulfur compounds are decomposed to hydrogen sulfide, then remove the hydrogen sulfide, and subsequently contact the desulfurized vapors over chromium oxide gel whereby some dehydrogenation of the hydrocarbons takes place. I have found, however, that these combined results can substantially be obtained in one catalytic step through the use of bauxite impregnated with chromium oxide.

I believe the excellent results obtained with the bauxite-chromium oxide catalyts are due to the fact that the chromium oxide in this mixture is not readily poisoned by the sulfur compounds in the hydrocarbon vapors. I have found that when treating sulfur-bearing hydrocarbon vapors over chromium oxide alone that considerable hydrogen sulfide is taken up either by adsorption or by conversion of the oxide to the sulfide. Similarly when treating such vapors over bauxite or aluminum oxide very little hydrogen sulfide is retained by the catalyst. I have concluded, therefore, that adsorption and desorption of hydrogen sulfide from bauxite are both very rapid whereas desorption of hydrogen sulfide from chromium oxide gel is very slow. It is likely that the so-called poisoning of chromium oxide for dehydrogenation is due to this slow desorption of accumulated hydrogen sulfide. The bauxite impregnated with chromium oxide constitutes a catalytic mass which desorbs hydrogen sulfide at a very high rate; hence this catalytic material is not susceptible to ordinary poisoning with sulfur compounds and is highly effective for the purposes claimed.

Instead of the bauxite-chromium nitrate preparation, a very satisfactory catalytic material may be made by impregnating bauxite with a concentrated solution of ammonium dichromate. The material may then be heated to the temperature where the ammonium dichromate decomposes slowly to chromium oxide. Other soluble chromium salts readily convertible to the oxide form may, of course, be employed.

Diaspore and other naturally occurring bauxite-like materials may be used instead of the bauxite in the preparation of these improved catalytic materials. I have found moreover that certain commercial aluminas, although much more expensive than bauxite, when used for this purpose frequently make much less effective catalytic materials than the naturally occurring bauxites. I attribute this difference to the physical and chemical structure of these materials. It is fairly definitely established that gibbsite is $Al_2O_3.3H_2O$ and diaspore is $Al_2O_3.H_2O$, but the composition of bauxite is still doubtful.

In utilizing catalysts of the present type in the treatment of hydrocarbon vapors, they may be employed alone or in admixture with relatively inert siliceous spacing materials.

Catalytic materials containing various percentages of chromium oxide may, of course, be prepared according to my invention. A very satisfactory material consists of 95 parts by weight bauxite and 5 parts chromium oxide. Smaller or larger percentages of chromium oxide may obviously be used but extremely economic catalysts can be prepared through the use of less than 5 per cent chromium oxide.

It has been found that with use these catalysts gradually lose their activity due to the accumulation of carbonaceous residues, but they may be reactivated indefinitely by burning out in situ with steam and air, or an oxidizing gas, or by burning in a furnace.

It is a feature of the present invention that when employing catalysts of the type disclosed that relatively low temperatures are sufficient to produce a marked reduction in sulfur content, as well as substantial dehydrogenation of normally gaseous paraffin hydrocarbon vapors. For example, temperatures of from 800 to 1100° F. are sufficient, although higher temperatures may, of course, be employed, if desired. High pressures are not needed in the operation of this process, extremely good results being obtained in the range of atmospheric to 100 pounds. Higher or lower pressures may be employed if economic conditions warrant them. In practice, however, it is usually desirable to use pressures somewhat above atmospheric so that the vapors may be conducted directly to a fractionator or to treating tanks for final processing. The preferred flow rate is of the order of 1 to 10 liquid volumes of feed stock per hour per volume of catalyst. At the higher temperature levels shorter contact times are sufficient; therefore, flow rates as high as 100 liquid volumes per hour per volume of catalyst may be employed.

Numerous examples might be given of the effects obtained by using the particular catalytic materials comprised within the scope of the invention in the treatment of light paraffin hydrocarbons, but the following is sufficiently indicative of the improved results which were obtained.

*Example I*

An untreated butane stock consisting substantially of normal butane obtained from a Mid-Continent natural gasoline was passed in vapor form over catalytic material consisting of 95 parts by weight bauxite impregnated with 5 parts by weight chromium oxide at a temperature of 975° F., atmospheric pressure and a flow rate of about 1 liquid volume of butane per hour per volume of catalyst.

The effluent gas from the catalyst was collected in toto, and periodic analyses were run to determine the percentage of hydrogen gas and the unsaturation of the total make and of the $C_4$ fraction. Snap samples during the run showed the hydrogen content of the treated gas to vary between 22.0 and 23.5 per cent by volume, while the total unsaturation of said gas varied between 15.4 and 16.5 per cent.

A composite sample representing the entire run was collected and the following analysis was obtained:

| Gas | Volume per cent |
|---|---|
| $H_2$ | 19.67 |
| $CH_4$ | 1.39 |
| $C_2H_4$ | 0.37 |
| $C_2H_6$ | 0.80 |
| $C_3H_6$ | 0.62 |
| $C_3H_8$ | 0.37 |
| iso-$C_4H_8$ | 3.25 |
| n-$C_4H_8$ | 11.25 |
| n-$C_4H_{10}$ | 62.13 |

The unsaturation of this sample was 15.45 per cent, indicating somewhat larger unsaturation than is represented by the total per cent of unsaturated $C_4$ hydrocarbons which in this case was 14.5 per cent. This increase in unsaturation is accounted for by dehydrogenation of the minor amounts of propane and ethane resulting from the convertive reactions. It should also be noted that unsaturated hydrocarbons include 3.25 per cent by volume of isobutylene resulting from a rearrangement or isomerization reaction on the catalyst.

The effluent gas from the catalyst was found to be substantially free of organic sulfur impurities present in the raw material, indicating substantial decomposition of said organic sulfur compounds by the desulfurizing action of the catalyst.

The fixed gas calculated as ethane and lighter formed during the treatment of this normal butane amounted to about 600 cubit feet (S. T. P.) per barrel of butane charged. Of this fixed gas, hydrogen gas amounted to about 88 per cent by volume and methane to about 6 per cent by volume or a hydrogen/methane ratio of about 14.5. At the end of about 12 hours, the catalyst showed some evidence of decline in activity due to carbon formation, but its activity was completely restored by heating and burning out with air.

*Example II*

The same normal butane of Example I was passed in vapor form over a catalyst composed of 95 parts by weight bauxite impregnated with 5 parts by weight chromium oxide at a temperature of 1070° F., atmospheric pressure and a flow rate of 2.5 liquid volumes of butane per hour per volume of catalyst. At the higher flow rates the fixed gas evolved amounted to only about 300 cubic feet (S. T. P.) per barrel of butane charged. An incomplete analysis of this total effluent gas was as follows:

| Gas | Volume per cent |
|---|---|
| $H_2$ | 21.5 |
| $CH_4$ | 1.5 |
| $C_2H_4$ | 0.7 |
| $C_2H_6$ | 0.6 |
| $C_3$ and heavier | 76.7 |

The unsaturation of the treated vapors averaged about 14.5 per cent during a 24 hour run, indicating about 15 per cent conversion per mass of the normal butane during this operating cycle. The hydrogen/methane ratio in this case was about 14.

*Example III*

Propane may be passed in the vapor form over the bauxite-chromium oxide catalyst at a temperature ranging between 1060 and 1100° F. and a flow rate corresponding to one liquid volume of propane per hour per volume of catalyst space. The conversion of propane during a period of 10 hours averages about 15 per cent. The sulfur compounds in the propane are decomposed to hydrogen sulfide.

*Example IV*

A light hydrocarbon gas containing 12 per cent ethane, 23 per cent propane, 30 per cent isobutane and 35 per cent normal butane may be passed in the vapor form at temperatures in the range of 1000 to 1100° F. over bauxite impregnated with chromium oxide. When the temperature is maintained near 1000° F. and the flow rate corresponds to two liquid volumes per hour per volume of catalyst space, the normal butane and isobutane are dehydrogenated to an extent of 15 or more per cent but large amounts of the propane and ethane are not converted under these conditions. At a temperature of 1100° F. and a flow rate of one liquid volume or less per hour per volume of catalyst space, all of the components of the gas mixture are partially dehydrogenated. In each instance the sulfur compounds are decomposed to hydrogen sulfide. Recycling of part of the stream of hot treated vapors for a second pass through the catalyst tower increases the extent of conversion still further.

I have found that in the treatment of low molecular weight normally gaseous paraffin hydrocarbons over these bauxite catalysts impregnated with chromium oxide in the temperature range of 800 to 1100° F., as shown in the examples given above, considerable dehydrogenation of the hydrocarbons occurs as well as some isomerization. There is only a very slight amount of cracking, as evidenced by the small proportion of methane in the gas, providing, of course, that the temperature and contact time are properly chosen, since it is obvious that substantially long contact times at temperatures above those needed for the dehydrogenation reactions will produce cracking. With proper choice of temperature and contact time, both of which vary somewhat with the hydrocarbons being treated, it is possible by means of this invention to substantially avoid the formation of methane and other products of cracking. Hydrogen to methane ratios of as high as 15 to 1 and even higher can be readily obtained.

In the practice of my process for the treatment of hydrocarbon stocks to obtain desulfurization, dehydrogenation and the like concurrently, best results are obtained with rather thoroughly dehydrated catalytic materials. The first step in this process usually consists, therefore, in dehydrating the bauxite-chromium oxide catalyst, preferably in situ, by raising the temperature gradually to the temperature of operation or higher while a slow stream of air or hydrocarbon gas is passed over it. Vacuum drying may be done, if desired. This step of passing air or hydrocarbon gas over the catalyst can obviously be omitted in practice, and the hydrocarbon vapors started immediately over the catalyst. Much of the improvement normally obtained in the hydrocarbon stock will be lost, of course, during the first few hours of operation in this manner, or at least until the working temperature has been reached and the catalyst has been substantially dehydrated.

It has been found that the hydrogen-bearing gas which is formed during the treatment of hydrocarbon stocks according to my invention may be recycled through the system by adding such gas, or a portion of it, to the hydrocarbon vapors prior to passage over the catalyst. Such hydrogen gas should, of course, not be allowed to pyramid too much or the reactions may be unfavorably influenced. Also, in processing hydrocarbon stocks containing appreciable quantities of sulfur compounds, the hydrogen sulfide should be removed from the gas prior to recycling.

Obviously the hydrogen gas produced as a by-product in my process has considerable economic value. A gas containing up to 95 per cent hydrogen and the balance methane can be readily obtained by applying simple extraction methods for the removal of the small amounts of hydrocarbons higher than methane. Concentrations of hydrogen higher than 95 per cent can be obtained by more elaborate extraction methods. In any event the hydrogen for hydrogenation and/or other purposes can be obtained in this treatment of gasoline stocks over bauxite-chromium oxide catalyst at extremely low cost. A very distinct advantage of my process is the formation of relatively large quantities of hydrogen from such hydrocarbons as those of the aliphatic series with methane being the only impurity in appreciable amount. Obviously this gas can be utilized for many purposes where the more common mixture of hydrogen and carbon monoxide cannot be tolerated at any cost.

If desired, the hydrocarbon vapors may be given two or more successive treatments with the bauxite-chromium oxide catalyst in a series of towers, or the vapors or any fraction thereof may be recycled with the fresh vapors through the catalyst tower. Some additional heat, also, may be supplied to the vapors prior to the second and/or successive catalytic treatments.

Following the treatment of the vapors over the catalyst the decomposed impurities and light gas fraction are separated from the heavier hydrocarbons by fractional condensation or any other conventional means, as will be well understood by those skilled in the art. If desired, the uncondensed light gas fraction may be passed through a vapor recovery plant of the absorption or other conventional type whereby the hydrocarbons other than methane may be recovered and made useful for other purposes. Also, the decomposed impurities may be removed by chemical means in a step apart from that of removal of the hydrogen and methane.

The low-boiling paraffin hydrocarbon stocks after treatment according to this invention may be treated in any manner suitable for removing or utilizing the unsaturates contained therein, such as polymerization of propylene and butylenes to form polymer gasoline. After such treatment, the unchanged paraffinic hydrocarbons may be recharged to my catalyst for further conversion and dehydrogenation.

Any methane occurring with said raw stocks or formed during the catalytic conversion may be treated along with the heavier hydrocarbons, said methane gas being substantially unchanged at conversion conditions and acting merely as a diluent and a source of heat for the reactant gases.

Figure 1 represents schematically one type of apparatus in which my process may be used. This drawing shows the raw hydrocarbon stock vapors entering a heater 1 where they are raised to the desired treating temperature. From the heater the hot vapors pass directly to the catalyst chamber 2, and after passage over the catalyst, may go direct to the fractionating unit 4, or may be treated for the removal of hydrogen sulfide at 3. In the fractionating unit the treated vapors are fractionated to send the hydrogen and lighter hydrocarbons over head, while the heavier hydrocarbons pass to the unit 5 for extraction of olefins. Said heavier hydrocarbons may alternatively be treated for hydrogen sulfide removal at 6, prior to unit 5. From 5 the unconverted paraffin hydrocarbons may be returned through the recycle line to the compressor 7 and thence to the heater 1 for heating prior to a second catalytic treatment. Also, all or a portion of the hydrogen and lighter hydrocarbon fraction may be sent through compressor 7 and recycled to the heater and catalyst chamber as a diluent and a source of endothermal heat.

Figure 2 represents apparatus for the recycling of part of the stream of hot treated vapors for a second pass through the catalyst tower. In this instance the stream of hot treated vapors leaving the catalyst tower 1, is split, one part going through a compressor 8 (or its equivalent) wherein the pressure is raised just enough to force the recycled vapors into the stream of heated raw hydrocarbon vapors prior to passage into the catalyst tower. Figure 3 illustrates an alternative method for giving hydrocarbon vapors successive treatments in two catalyst towers in series with the alternative also of recycling a portion of the hot treated vapors. Figure 4 illustrates a method for supplying additional heat to the hydrocarbon stock vapors prior to the second catalyst tower.

The foregoing specification and examples have disclosed and illustrated the invention, but since it is of generally wide application and the number of examples of results obtainable by its use might be multiplied greatly, neither is to be construed as imposing limitations upon the scope of the invention. The term light or low-boiling paraffin hydrocarbons as used herein includes the normally gaseous hydrocarbons of the aliphatic series containing two to four carbon atoms such as occur in natural gas, natural gasolines, refinery gases and vapor recovery gasolines, and polymerization processes and/or mixtures or blends of any two or more of said light paraffin hydrocarbons.

I claim:

1. A process for concurrently desulfurizing and dehydrogenating organic sulfur-containing aliphatic hydrocarbon stocks containing two to four carbon atoms which comprises contacting said hydrocarbon stocks in vapor form at pressures between atmospheric and 100 pounds per square inch with a dehydrated bauxite catalyst impregnated with a solution of a chromium compound subsequently converted to chromium oxide, the catalyst containing a major proportion of bauxite and a minor proportion of chromium oxide, at a temperature within the range of 800 to 1100° F. and a flow rate of about 1 to 10 liquid volumes of raw material per hour per volume of catalyst, dividing the effluent from the catalyst treatment into two streams of identical composition, recycling one of the streams without substantial cooling back into the raw heated vapors prior to the catalyst chamber, separating from the other stream of treated vapors the decomposed impurities and the gas fraction containing a substantial proportion of hydrogen gas, and the heavier hydrocarbons, and thereby obtaining substantially desulfurized hydrocarbon stocks with greatly increased unsaturation.

2. A process for dehydrogenating aliphatic hydrocarbon stocks containing two to four carbon atoms which comprises contacting said hydrocarbon stocks in vapor form at pressures between atmospheric and 100 pounds per square inch with a dehydrated bauxite catalyst impregnated with a solution of a chromium compound subsequently converted to chromium oxide, the dehydrated catalyst containing a major proportion of bauxite and a minor proportion of chromium oxide, at a temperature in the range of 800 to 1100° F. and a flow rate of about 1 to 10 liquid volumes of hydrocarbon stocks per hour per volume of catalyst, dividing the effluent from the catalyst treatment into two streams of identical composition, recycling one of the streams without substantial cooling back into the raw heated vapors prior to the catalyst chamber and separating the other stream of treated vapors into a light fraction consisting mostly of hydrogen and a hydrocarbon stock of greatly increased unsaturation.

WALTER A. SCHULZE.